United States Patent [19]

Ohsawa et al.

[11] Patent Number: 4,523,715
[45] Date of Patent: Jun. 18, 1985

[54] METHOD AND APPARATUS FOR AIR CONDITIONER CONTROL

[75] Inventors: Eiji Ohsawa, Ebina; Shunsuke Kajita, Hiratsuka, both of Japan

[73] Assignee: Nissan Motor Company, Limited, Yokohama, Japan

[21] Appl. No.: 603,828

[22] Filed: Apr. 25, 1984

[30] Foreign Application Priority Data

Sep. 14, 1983 [JP] Japan .................. 58-168397

[51] Int. Cl.³ .............................. F24F 7/00
[52] U.S. Cl. ........................ 236/49; 165/43; 62/179
[58] Field of Search ............ 236/49; 165/22, 16, 165/43; 62/179

[56] References Cited

U.S. PATENT DOCUMENTS

| | | |
|---|---|---|
| 2,189,895 | 6/1936 | Grutzner . |
| 3,658,244 | 4/1972 | Caldwell . |
| 3,814,173 | 6/1974 | Coon ................ 165/22 X |
| 3,934,642 | 1/1976 | Coulson . |
| 4,311,188 | 1/1982 | Kojima et al. . |
| 4,325,426 | 4/1982 | Otsuka . |
| 4,344,565 | 8/1982 | Kojima et al. . |
| 4,383,642 | 5/1933 | Sumikawa . |
| 4,406,397 | 9/1983 | Kamata et al. ............ 236/49 X |
| 4,407,446 | 10/1983 | Iijima et al. ............ 165/16 X |
| 4,407,447 | 10/1983 | Sayegh ................ 165/22 X |
| 4,408,713 | 10/1983 | Lijima et al. . |
| 4,417,688 | 11/1983 | Schaibel et al. . |
| 4,460,036 | 7/1984 | Yoshimi . |

FOREIGN PATENT DOCUMENTS 58-145518  8/1983  Japan .
2090966  7/1982  United Kingdom ............ 236/49

Primary Examiner—William E. Wayner
Attorney, Agent, or Firm—Schwartz, Jeffery, Schwaab, Mack, Blumenthal & Koch

[57] ABSTRACT

A method and apparatus for controlling an air conditioner having a motor-driven blower for creating air flow through an air passage which opens into a compartment through a plurality of outlets. The rate of air flow through the air passage is changed with a change of the number of outlet or outlets to be open, so as to avoid an undesirable air blowing rate caused by a change of resistance to air flow through the air passage.

8 Claims, 6 Drawing Figures

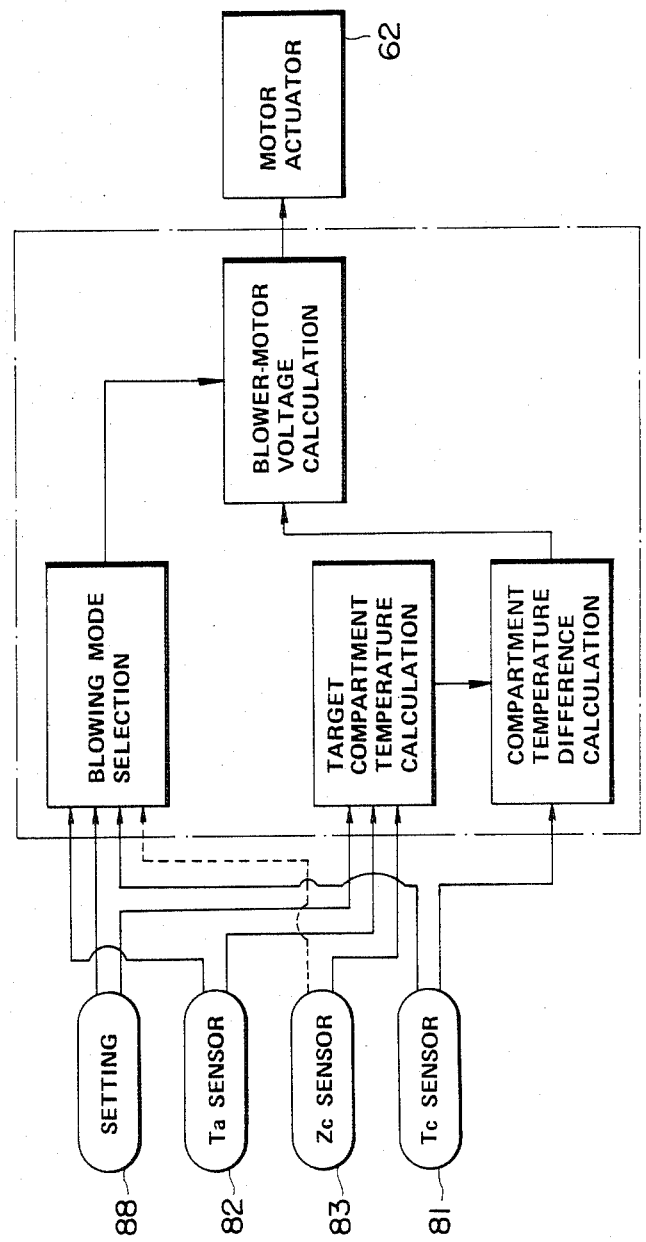

METHOD AND APPARATUS FOR AIR CONDITIONER CONTROL

BACKGROUND OF THE INVENTION

This invention relates to a method and apparatus for the control of an air conditioner used in a process of treating air in a compartment to regulate its temperature. While the general principles and teachings hereinafter disclosed are applicable to all air conditioners, the invention is hereinafter described in detail in connection with its application to an air conditioner for use in automotive vehicles.

There has been developed a type of air conditioner having a motor-driven blower for creating air flow through an air passage which opens into a compartment through a plurality of outlets. Each of these outlets is controlled to selectively block or permit air flow through it into the compartment as required during an air-blowing mode. For example, a selected one of the outlets opens to permit air flow through it into the compartment upon a requirement for single-flow mode such as "vent" mode, whereas a selected pair of the outlets open to permit air flow through them into the compartment upon a requirement for dual-flow mode such as "heat" mode and "bi-level" mode.

It is the normal practice to control the voltage to the blower-motor, which determines the rate of air flow through the air passage, based upon a difference between actual and target values for compartment temperature without accounting for a change between single- and dual-flow modes. That is, the voltage to the blower-motor remains unchanged upon a change between single- and dual-flow modes. This causes a change in the rate of air flow to the compartment through each outlet. Such an air flow rate change cause the user discomfort.

Therefore, the present invention provides an improved method and apparatus for the control of an air conditioner which can maintain the blowing-air flow rate unchanged upon a change of the air-blowing mode and which can enhance passenger comfort.

SUMMARY OF THE INVENTION

There is provided, in accordance with the present invention, an apparatus for controlling an air conditioner used in a process of treating air in a compartment to regulate its temperature. The air conditioner has an air passage which opens into the compartment through a plurality of outlets. The apparatus comprises an outlet control means for closing each of the outlets to block air flow through it. The outlet control means is operable to open selected outlet or outlets to permit air flow therethrough. An air-flow control means controls the rate of air flow through the air passage toward the compartment. A control circuit is provided which determines a value corresponding to a setting of the air-flow control means based upon the number of outlets selected to be open. A circuit is coupled between the control circuit and the air-flow control means for converting the determined value into a setting of the air-flow control means to control the rate of air flow through the air passage.

In another aspect, the present invention provides a method of controlling an air conditioner used in a process of treating air in a compartment to regulate its temperature. The air conditioner has an air passage opening into the compartment through a plurality of outlets, and an outlet control means for closing each of the outlets to block air flow through it. The outlet control means is operable to open a selected outlet or outlets to permit air flow therethrough. The air conditioner also includes an air-flow control means for controlling the rate of air flow through the air passage toward the compartment. The method comprises the steps of selecting one of the outlets in response to a single-flow mode requirement or two of the outlets in response to a dual-flow mode requirement, calculating a value corresponding to a setting of the air-flow control means based upon the number of selected outlets, and converting the calculated value into a setting of the air-flow control means.

BRIEF DESCRIPTION OF THE DRAWINGS

The present invention will be described in greater detail by reference to the following description taken in connection with the accompanying drawings, in which:

FIG. 6 shows control system functional portions in block diagram form.

DETAILED DESCRIPTION OF THE PREFERRED EMBODIMENTS

In the following description, the method and apparatus of the invention are embodied in a control system as applied to an air conditioner used in a process of treating air in a compartment to regulate its temperature. The controlled variables, that is, the adjustable variables selected to control or determine the characteristics of the conditioner's air treating process, are mixing-door position and blower-motor voltage. Means are provided for adjusting or setting each of these controlled variables.

Adjustments of these controlled variables are made while the air conditioner is operative in treating air in the compartment. A digital computer is employed to calculate arithmetically, repetitively and on a real-time bases, values corresponding to settings of the controlled variables. These values are calculated by the digital computer based upon a desired predetermined algebraic relationship established between the particular controlled variables and one or more conditions of the air conditioner that are sensed during its operation.

In this embodiment of the invention, the controlled variable blower-motor voltage is algebraically related to the sensed conditions of ambient temperature, insolation quantity, compartment temperature, and a setting of desired compartment temperature. With respect to the controlled variable mixing-door position, which determines the temperature of the air discharged into the compartment, the sensed conditions to which it is algebraically related are ambient temperature, insolation quantity, compartment temperature, and a setting of desired compartment temperature. The desired relationships between the controlled variables and the sensed conditions take into account the inter-dependence of the controlled variables and these desired relationships are determined experimentally.

Figure 1:
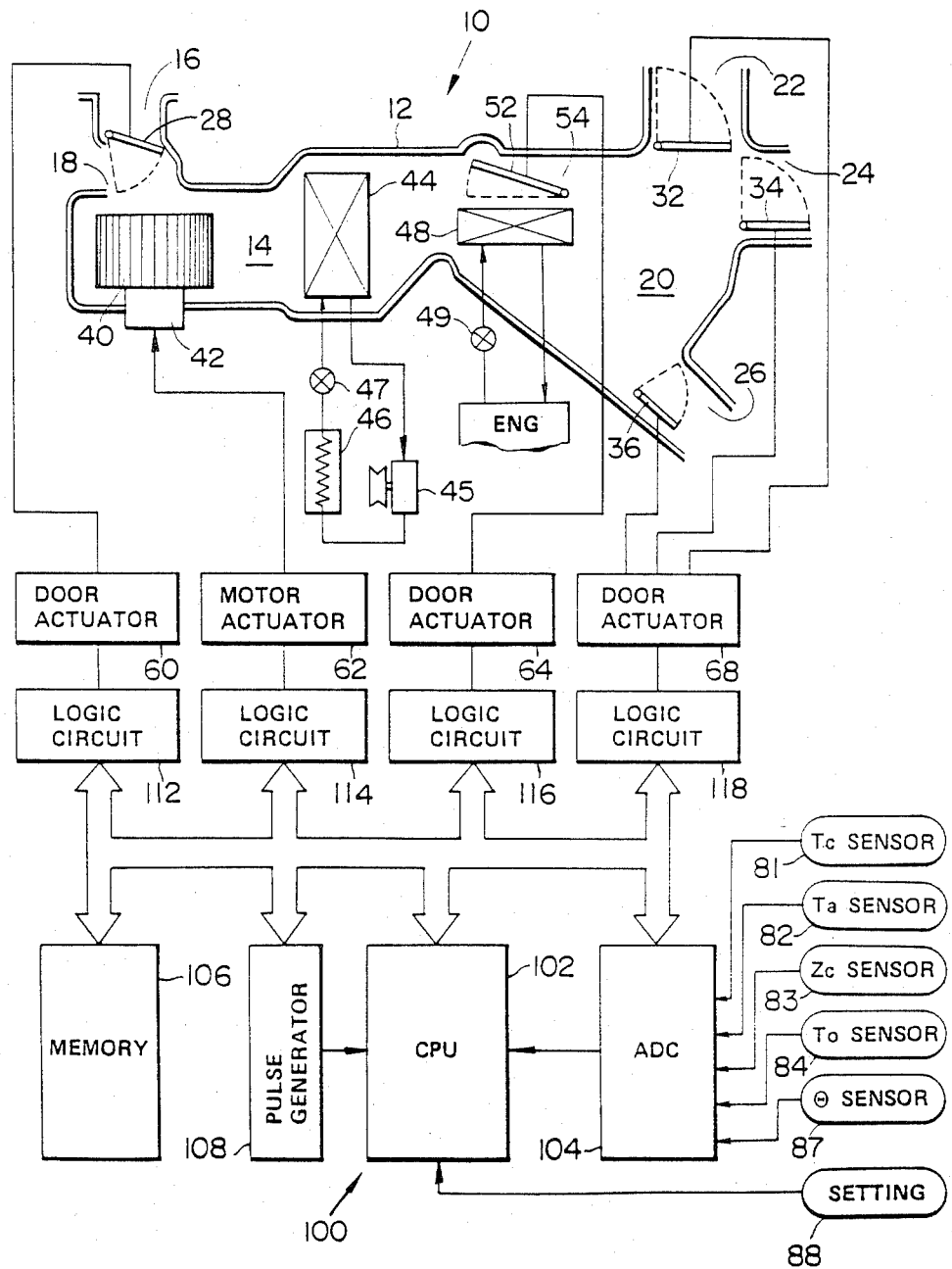
FIG. 1 is a schematic block diagram of an air conditioner control system made in accordance with the present invention.

With reference to the drawings and in particular to FIG. 1, there is shown a schematic block diagram of an air conditioner control system embodying the method and apparatus of the invention. An air conditioner, generally designated by the numeral 10, for blowing air at a desired temperature and rate into a passenger compartment of an automotive vehicle, includes a duct or housing 12 which defines therein an air passage 14. The air passage 14 has at its upstream end first and second inlets 16 and 18 and at its downstream end a mixing chamber 20 which has first, second and third outlets 22, 24 and 26. The first and second inlets 16 and 18 may be referred to as "interior-air" and "exterior-air" inlets, respectively. The interior-air inlet 16 communicates with the passenger compartment (not shown). The exterior-air inlet 18 communicates with the atmosphere through an air inlet port (not shown) formed in the cowl top panel. An inlet door 28 is mounted for swinging movement between two positions within the air passage 14. The first position results in the inlet door 28 blocking air flow through the interior-air inlet 16. The second position results in the inlet door 28 blocking air flow through the exterior-air inlet 18.

The first, second and third outlet doors 22, 24 and 26 may be referred to as "defroster", "vent" and "floor" outlets, respectively. The defroster outlet 22 communicates with defroster nozzles (not shown) for blowing hot air toward the front windshield so as to defrost or demist the front windshield. A defrost door 32 is provided to selectively open and close the defrost outlet 22. The vent outlet 24 communicates with the passenger compartment through an opening (not shown) formed in the instrument panel. A vent door 34 is provided which is effective to selectively open and close the vent outlet 24. The floor outlet 26 communicates with an opening (not shown) opening toward the passenger compartment floor. A floor door 36 is provided for selectively opening and closing the floor outlet 26.

A fan or blower 40 is located within the air passage 14 downstream of the interior-air and exterior-air inlets 16 and 18. The blower 40 is driven by a blower motor 42 to create an air stream through the air passage in a direction from the inlets 16 and 18 toward the outlets 22, 24 and 26 when a voltage is applied to the blower motor 42. The magnitude of the voltage applied to the blower motor 42 determines the speed of rotation of the blower 40 and, thus, determines the rate of air flow through the air passage 14.

An evaporator 44 is located in the air passage 14 downstream of the blower 40. The evaporator 44 is connected in a cooling circuit which includes a compressor 45, a condenser 46 and an expansion valve 47. The evaporator 44 is effective to cool and dehumidify the air fed from the blower 40. A heater core 48 is situated in the air passage 14 downstream of the evaporator 44 and upstream of the mixing chamber 20. The heater core 48 is effective to heat the air flowing thereover into the mixing chamber 20. The heater core 48 is connected in an engine coolant circuit which is connected to the coolant circulation system of the engine (ENG) through a water cock 49 which permits recirculation of engine coolant into and out of the heater core 48 when opened.

A mixing door 52 is situated adjacent the heater core 48 to define a bypass passage 54 along with the duct 12 to divide the cooled air fed from the evaporator 44 into two air flows, the first being directed through the bypass passage 54 into the mixing chamber 20. The second air flow is directed to the heater core 48 where it is heated and hence into the mixing chamber 20 where it is mixed with the first air flow. The position of the mixing door 52, that is, the degree of opening of the mixing door 52, determines the rate of air flow through the bypass passage 54 and, thus, the temperature of the air mixed in the mixing chamber 20.

The position of the inlet door 28 is varied by a pressure actuated inlet-door actuator 60 which is electrically controlled to selectively close one of the interior-air and exterior-air inlets 16 and 18 in accordance with a temperature differential between the interior and exterior air temperatures. For example, the inlet door 28 closes the exterior-air inlet 18 when it is desired to increase the temperature in the passenger compartment. The inlet door 28 may be moved to a position permitting introduction of both interior and exterior air into the air passage 14. The positions of the outlet doors 32, 34 and 36 are changed separately by an outlet-door actuator 68 which is electrically controlled to selectively close and open the corresponding outlet in accordance with selection of a desired mode of operation of the air conditioner 10. For example, the outlet-door actuator 68 opens the vent door 24 when a "vent" mode is required, the vent and floor doors 34 and 36 when a "bi-level" mode is required, and the defrost and floor doors 32 and 36 when a "heat" mode is required.

The blower motor 42 is connected to a blower-motor drive circuit or actuator 62. The blower-motor drive circuit 62 is electrically controlled and it determines the magnitude of the voltage applied to the blower motor 42 which, in turn, determines the amount of air permitted to enter the mixing chamber 20. The mixing door 52 is connected by a mechanical linkage to a mixing-door actuator 64 which may include a pressure-actuated device or a stepper motor. The mixing-door actuator 64 is electrically controlled and it determines the setting of the mixing door 52 which, in turn, determines the amount of air permitted to enter the bypass passage 54 and, thus, the temperature of the air admitted into the mixing chamber 20.

The rate of air flow through the air passage 14, this being determined by the magnitude of the voltage applied to the blower motor 42, and the temperature of the air in the mixing chamber 20, this being determined by the position of the mixing door 52, are repetitively determined from arithmetic calculations performed by a digital computer, these calculations being based upon various air-conditioner operating conditions that are sensed during the operation of the air conditioner 10. These sensed operating conditions include compartment temperature, ambient temperature, insolation quantity, and blown-air temperature. The position of the mixing door 52 is also sensed. These operating conditions form the inputs to an analog-to-digital converter (ADC) 104. Thus, a compartment temperature (Tc) sensor 81, an ambient temperature sensor (Ta) 82, an insolation (Zc) sensor 83, blown-air temperature (To) sensors, one of which is shown at 84, and a door position (θ) sensor 87 are connected, respectively, to ADC 104.

The compartment temperature sensor 81 preferably is a thermistor device which is mounted on the ceiling of the passenger compartment and is connected in an electrical circuit capable of producing a DC voltage having a variable level proportional to compartment temperature. The ambient temperature sensor 82 preferably is a thermistor device connected similarly in an electrical circuit and positioned to sense ambient temperature. A preferred location for the ambient temperature sensor is on the front bumper somewhere not exposed to sunshine. The insolation sensor 83 preferably is mounted on the cowl top grille and is connected in an electrical circuit capable of producing a DC voltage having a variable level corresponding to the intensity of solar radiation incident into the passenger compartment. The blown-air temperature sensor 84 is positioned to sense the temperature of the air blowing into the passenger compartment through the corresponding outlet and generates a DC voltage proportional to the sensed temperature. The door position sensor 87 is connected by a mechanical linkage to the mixing door 52 and it generates a DC voltage having a variable level corresponding to the degree of opening of the mixing door 52.

A compartment temperature setting unit 88, which may be installed on the instrument panel in any convenient location, is manually operable to set a desired compartment temperature to which the compartment temperature is to be controlled or adjusted. The compartment temperature setting unit 88 generates a digital signal corresponding to the manual setting for the compartment temperature.

A digital computer, generally designated by the numeral 100, includes a microprocessor (CPU) 102, the analog-to-digital converter (ADC) 104, and a memory 106 which includes a read only memory (ROM) and a read/write memory (RAM). The ROM contains the program for operating the CPU 102 and further contains appropriate air-conditioner control data in look-up tables which identify, as a function of air-conditioner parameters, an appropriate blower voltage and mixing-door position. The look-up table data may be obtained experimentally or derived empirically. A timing pulse generator 108 is included in the digital computer 100. The timing pulse generator 108 generates timing pulses to the digital computer central processing unit 102 at constant time intervals or at time intervals proportional to engine speed.

Logic circuits interconnect the digital computer central processing unit 102 and its memory 106 with the actuators for the controlled variables blower-voltage and mixing-door position. Thus, a blower-motor-control logic circuit 114 is connected to the digital computer central processing unit 102 and to the memory 106. The output of the blower-motor-control logic circuit 114 is supplied to the blower-motor drive circuit 62. The blower-motor-control logic circuit 114 may receive a digital signal corresponding to the actual voltage at which the blower motor 42 is running for feedback control of the blower-motor voltage. Similarly, a door-position-control logic circuit 116 receives its input from the digital computer and its output is connected to the mixing-door actuator 64. The door-position-control logic circuit 116 may receive a digital signal corresponding to the sensed mixing-door position for feedback control of the mixing-door-position.

Briefly summarized, the air-conditioner control system of FIG. 1 performs the operation steps of: causing the digital signal representative of the manual setting for the compartment temperature to be read into the memory; causing the DC voltages representative of the sensed air-conditioner operating conditions to be converted into digital form and read into the memory; from these read values and using the digital computer central processing unit 102, calculating values for blower-motor voltage and mixing-door position; and outputting these calculated values to the appropriate logic circuits used to convert them into changes of the settings of the controlled variables.

Figure 2:
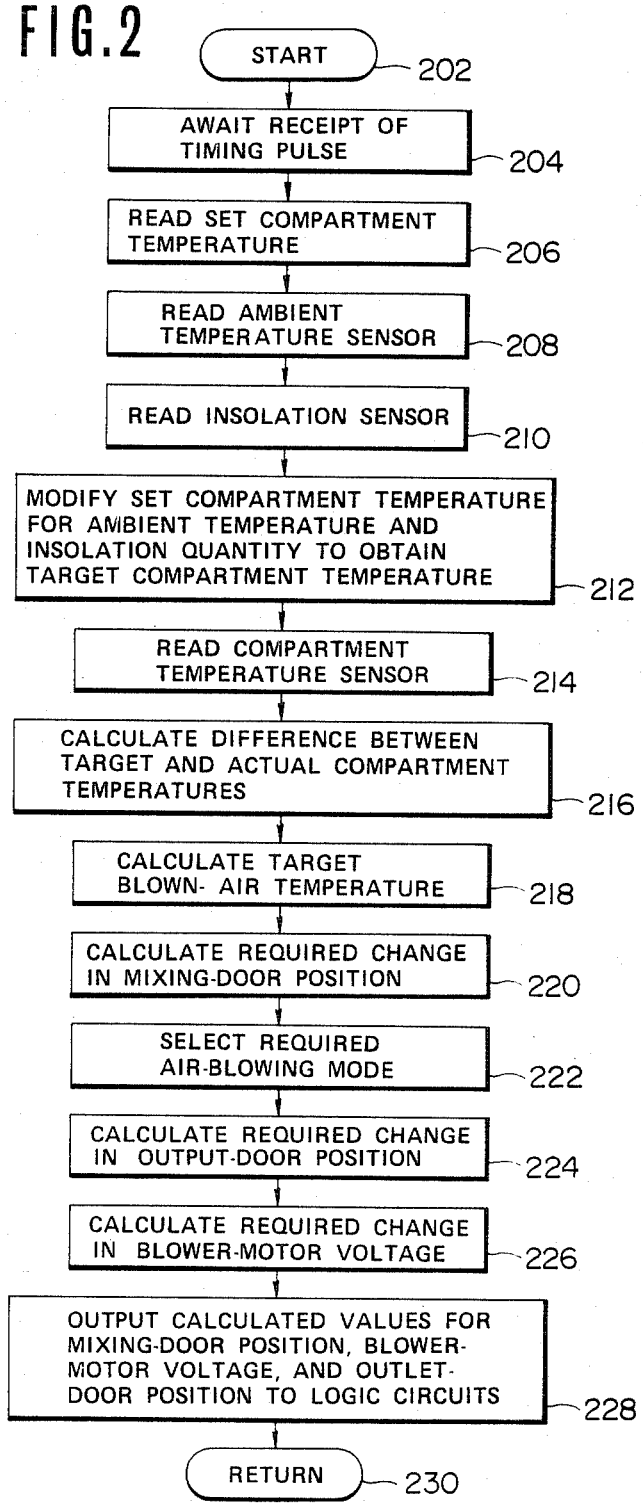
FIG. 2 is a flow diagram illustrative of the operation of the digital computer used to calculate values for the adjustable devices used to control mixing-door position and blower-motor voltage.

FIG. 2 is an overall flow diagram of the programming of the digital computer. The computer program is entered at the point 202 when a power switch is turned on to start the operation of the air conditioner 10. At the point 204 in the program, the digital computer, which shall be regarded as including the central processing unit 102, the analog-to-digital converter 104, the memory 106, and the timing pulse genertor 108, awaits the receipt of a timing pulse. After the receipt of this timing pulse, at the point 206 in the program, the manually-set compartment temperature is read into the computer memory 106.

Following this, the various inputs to the analog-to-digital converter 104 are, one by one, converted into digital form and read into the computer memory 106. Thus, at the point 208 in the program, the ambient temperature signal is converted into digital form and read into the computer memory 106. Similarly, at the point 210, the insolation quantity signal is converted into digital form and read into the computer memory 106.

At the point 212, the digital computer central processing unit 102 modifies the manually set compartment temperature for the read values for ambient temperature and insolation quantity to obtain a target compartment temperature from an algebraic relationship programmed into the computer.

At the point 214 in the program, the actual compartment temperature signal is converted into digital form and read into the computer memory. At the point 216, the difference ($\Delta T$) between the target compartment temperature and the actual compartment temperature is arithmetically calculated by the digital computer central processing unit 102.

At the point 218 in the program, the target blown-air temperature is calculated by the digital computer central processing unit 102 from an algebraic relationship which specifies target blown-air temperature as a function of the calculated compartment temperature difference ($\Delta T$). At the point 220, the digital computer central processing unit 102 calculates the required change in mixing-door position. The mixing-door position requirement is determined from an algebraic relationship which specifies this controlled variable in terms of the calculated value for blown-air temperature.

At the point 222 in the program, the digital computer central processing unit 102 selects one of "heat", "bi-level" and "vent" modes in accordance with a command manually provided by the user or automatically in accordance with air conditioner conditions. This selection of air-blowing mode may be made based upon mixing-door position in which case it selects the "heat" mode at a mixing-door position less than a predetermined value, the "vent" mode at a mixing-door position greater than a predetermined higher value, and the "bi-level" mode at a mixing-door position ranging between the lower and higher values. Alternatively, the digital computer central processing unit 102 may select one of these air-blowing modes based upon ambient temperature, manually-set compartment temperature, and insolation quantity.

At the point 224 in the program, the digital computer central processing unit 102 calculates the required change in output-door position from the selected air-blowing mode. At the point 226, the required change in blower-motor voltage is calculated by the digital computer central processing unit 102 from an algebraic relationship programmed into the computer. This relationship defines this controlled variable in terms of the calculated value for compartment temperature difference ($\Delta T$).

At the point 228 in the program, the calculated values for blower-motor voltage, mixing-door position and outlet-door position are transferred to the blower-motor-control logic circuit 114, the door-position-control logic circuit 116, and the door-position-control logic circuit 118, respectively. The blower-motor-control logic circuit 114 may have a digital input corresponding to the actual voltage at which the blower motor 42 is running for feedback control of the blower-motor voltage. Similarly, the door-position control logic circuit 116 sets the mixing-door position, according to the calculated value therefor, to cause the mixing-door actuator 64 to make a change in the position of the mixing door 52. The door-position-control logic circuit 116 may have a digital input corresponding to the actual mixing-door position for providing feedback control of the mixing-door position. The door-position-control logic circuit 118 causes the outlet-door actuator 68 to make a change in the position of each of the outlet doors 32, 34 and 36.

At the point 230 in the program, the computer program returns to the point 204 to await receipt of the next timing pulse.

In the preceding paragraphs, the arithmetic calculations at the point 226 in the program of FIG. 2 were not described in detail. This detail is presented in the following paragraphs.

Figure 3:
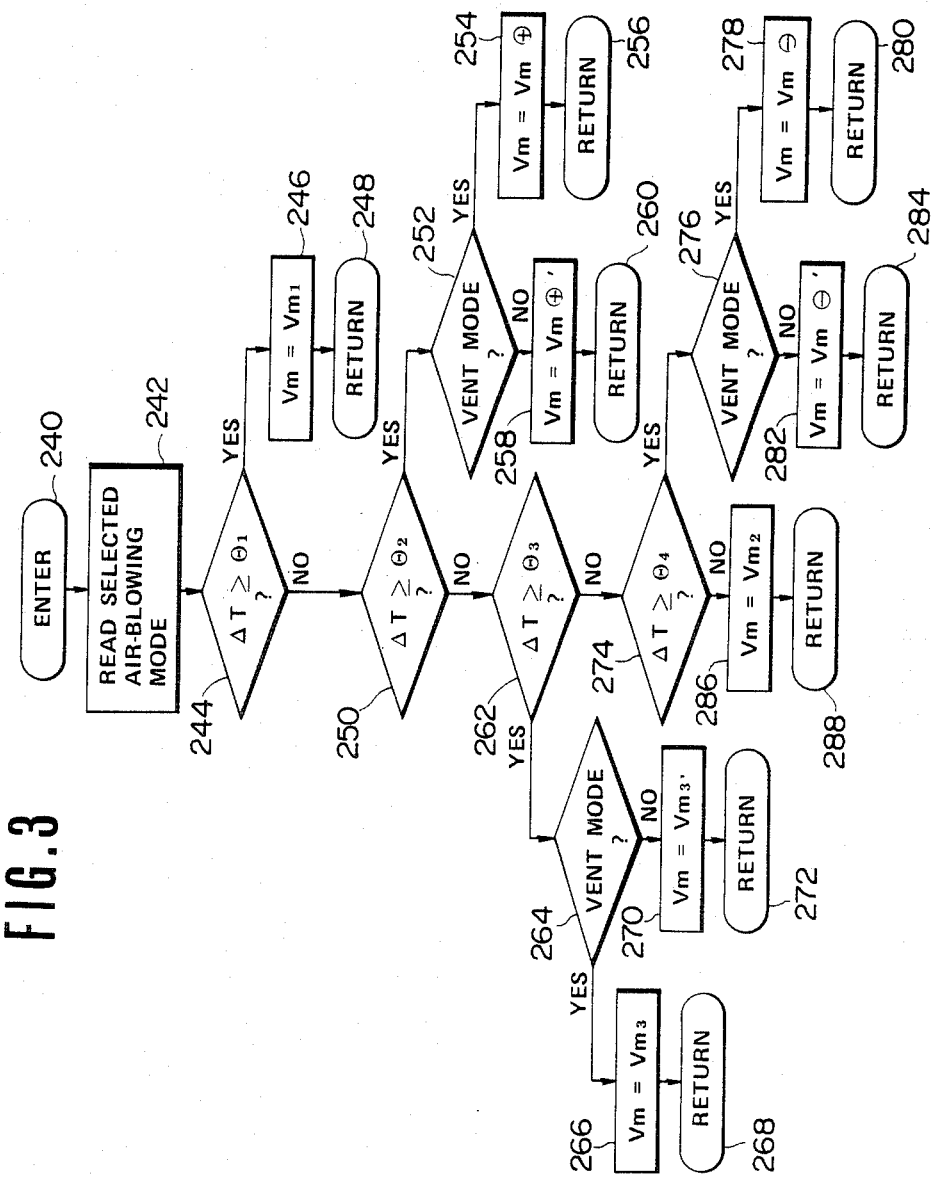
FIG. 3 is a detailed flow diagram illustrating the programming of the digital computer as it is used to control blower-motor voltage.

FIG. 3 is a flow diagram illustrating the above arithmetic calculation of required change in blower-motor voltage. At the point 240 in FIG. 3, which corresponds to the point 226 of FIG. 2, the computer program is entered. At the point 242, the air-blowing mode selected at the point 222 of FIG. 2 is read into the computer memory.

Figure 4:
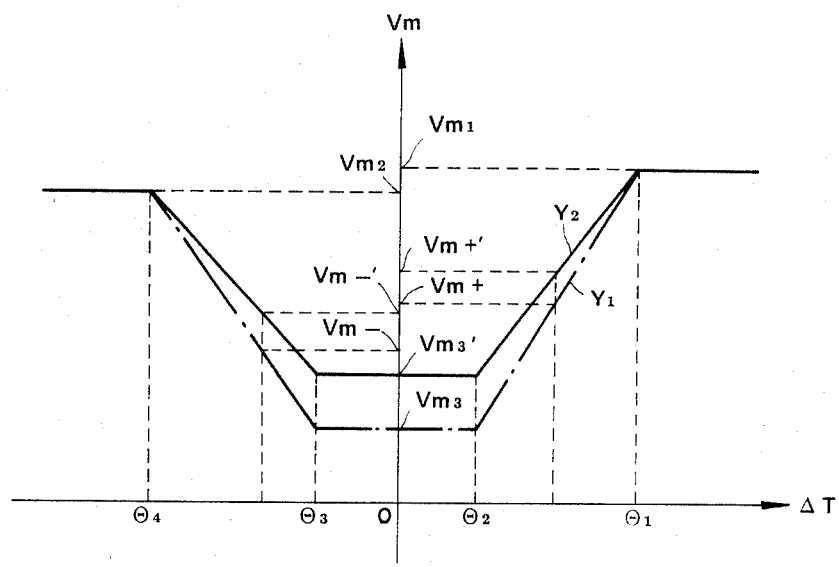
FIG. 4 is a graph of two curves representing blower-motor voltage versus difference between actual and target compartment temperatures, each curve being for a different air-blowing mode.

At a point 244 in the program, the calculated value for compartment temperature difference ($\Delta T$) is checked to determine if it is greater than or equal to a first predetermined value $\theta_1$. If the compartment temperature difference is greater than or equal to the first predetermined value, then at a point 246 in the program, the blower-motor voltage Vm is set to a predetermined maximum value $Vm_1$, as shown in FIG. 4. For example, the value $Vm_1$ may be in a range of 12 volts to 14 volts. This condition is encountered when powerful warm-up is required, for example, in severe cold weather. Following this, the program proceeds to a point 248 wherein the program returns to the entry point 230. If the compartment temperature difference value inputted to the point 244 is less than the first predetermined value $\theta_1$, then the program proceeds to a determination point 250 in the program.

At the point 250, a determination is made as to whether or not the calculated value for compartment temperature difference ($\Delta T$) is greater than or equal to a second predetermined value $\theta_2$ which is less than the first predetermined value $\theta_1$, as shown in FIG. 4. If the compartment temperature difference is greater than or equal to the second predetermined value, then at a point 252 in the program, another determination is made as to whether or not the air conditioner operation is set to a "vent" mode (blowing air through the "vent" outlet only). If the answer to this question is "yes", then the program proceeds to a point 254 where the blower-motor voltage Vm is set to a value Vm+ (FIG. 4) and then to a point 256 where the program returns to the entry point 240. The value Vm+ varies with variations in compartment temperature difference ($\Delta T$), as shown by the curve $Y_1$ of FIG. 4. The curve $Y_1$ relates to a single-flow mode. If the answer to the question at the point 252 is "no", then it means that the air conditioner operation is set to a "bi-level" or "heat" mode (blowing air through two outlets) and the program proceeds to a point 258 where the blower-motor voltage Vm is set to a value Vm+' which is greater than the value Vm+, as shown in FIG. 4. The value Vm+' varies with variations in the compartment temperature differences ($\Delta T$), as shown by the curve $Y_2$ of FIG. 4. The curve $Y_2$ relates to a dual-flow mode. After this setting of the blower-motor voltage, the program proceeds to a point 260 where the program returns to the entry point 240. If the compartment temperature difference value inputted to the point 250 is less than the second predetermined value value $\theta_2$, then the program proceeds to a determination point 262 in the program.

The determination at the point 262 is whether or not the calculated value for compartment temperature difference ($\Delta T$) is greater than or equal to a third predetermined value $\theta_3$ which is less than the second predetermined value $\theta_2$ as shown in FIG. 4. If the compartment temperature difference is greater than or equal to the value $\theta_3$, then the program proceeds to another determination point 264. This determination is whether or not the air conditioner condition is set to a "vent" mode. If the answer to this question is "yes", then the program proceeds to a point 266 where the blower-motor voltage Vm is set to a predetermined minimum value $Vm_3$, as shown in FIG. 4. For example, the value $Vm_3$ may be 5 volts. Following this, the program proceeds to a point 268 where the program returns to the entry point 240. If, at the point 264 in the program, the air conditioner operation is not set to a "vent" mode, then it means that the air conditioner operation is set to a "bi-level" or "heat" mode (blowing air through two outlets) and the program proceeds to a point 270 where the blower-motor voltage Vm is set to a predetermined value $Vm_3'$ which is greater than the value $Vm_3$, as shown in FIG. 4. The difference between the values $Vm_3'$ and $Vm_3$ is dependent upon the characteristic of the individual type of air conditioner and is normally set in a range of about 0.5 volts to 1.0 volts. After this setting of the blower-motor voltage, the program proceeds to a point 272 where the program returns to the entry point 240. If the compartment temperature difference value inputted to the point 262 is less than the third predetermined value $\theta_3$, then the program proceeds to a determination point 274 in the program.

At the point 274, a determination is made as to whether or not the calculated value for compartment temperature difference ($\Delta T$) is greater than or equal to a fourth value $\theta_4$ which is less than the third predetermined value $\theta_3$, as shown in FIG. 4. If the compartment temperature difference is greater than or equal to the fourth value, then at the point 276 in the program, another determination is made as to whether or not the air conditioner operation is set to a "vent" mode. If the answer to this question is "yes", then the program proceeds to a point 278 where the blower-motor voltage is set to a value Vm− which varies with variations in compartment temperature difference ($\Delta T$) as shown by the curve $Y_1$ of FIG. 4. After the setting of the blower-motor voltage, the program proceeds to a point 280 where the program returns to the entry point 240. If the answer to the question at the point 276 is "no", then it means that the air conditioner is set to a "bi-level" or "heat" mode (blowing air through two outlets) and the program proceeds to a point 282 where the blower-motor voltage is set to a value Vm−' which is greater than the value Vm−, as shown in FIG. 4. The value Vm−' varies with variations in compartment temperature difference ($\Delta T$) as shown by the curve $Y_2$ of FIG. 4. After this setting of the blower-motor voltage, the program proceeds to a point 284 where the program returns to the entry point 240. If the compartment temperature difference value inputted to the point 274 is less than the fourth predetermined value $\theta_4$, then the program proceeds to a point 286 where the blower-motor voltage Vm is set to a predetermined value $Vm_2$ (FIG. 4). This condition is encountered when powerful cool-down in required, for example, in severe hot weather. Following this, at a point 288 in the program, the program returns to the entry point 240.

Figure 5:
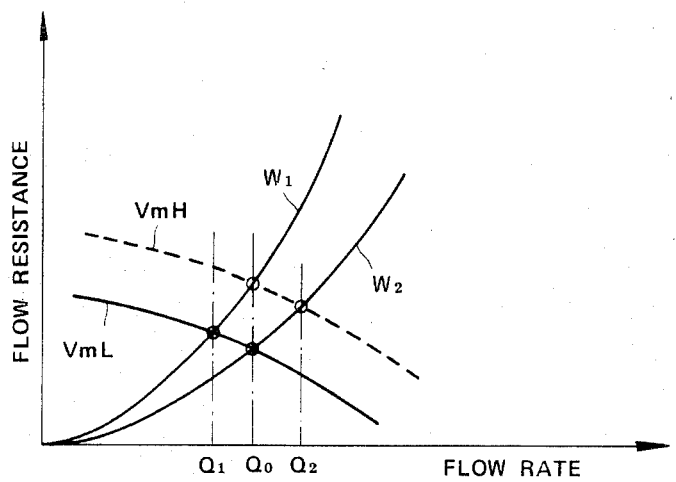
FIG. 5 is a graph of two curves representing flow resistance versus flow rate, each curve being for a different air-blowing mode.

FIG. 5 is a graph of two curves $W_1$ and $W_2$ representing flow resistance versus blowing-air flow rate, each curve being for a different air-blowing mode. The curve $W_1$ relates to a single-flow mode such for example as "vent" mode. The curve $W_2$ relates to a dual-flow mode such for example as "heat" mode and "bi-level" mode. As can be seen from FIG. 5, a change of the air-blowing mode with the blower-motor voltage being held unchanged will cause a change in blowing-air rate. That is, assuming that the blower-motor voltage remains unchanged, the blowing-air flow rate increases from a value Q0 to a value Q2 upon a change of the air-blowing mode from a single-flow mode to a dual-flow mode, and the blowing-air flow rate decreases from the value Q0 to a value Q1 upon a change of the air-blowing mode from a dual-flow mode to a single-flow mode. This stems from the fact that the resistance to air flow through the air passage is higher in a single-flow mode than in a dual-flow mode.

Referring to FIG. 6, the air-conditioner control system is shown in block diagram form. The blocks of FIG. 6 represent functional portions of the programmed digital computer 100. Given the description of this specification, appropriate digital and/or analog devices for such functional portions would be obvious to one skilled in the art in using the block diagram of FIGS. 2 and 3 as the basis for a hard-wired arrangement.

While this invention has been described in conjunction with specific embodiments thereof, it is evident that many alternatives, modifications and variations will be apparent to one skilled in the art. Accordingly, it is intended to embrace all alternatives, modifications and variations that fall within the spirit and broad scope of the appended claims.

What is claimed is:

1. An apparatus for controlling an air conditioner used in a process of treating air in a compartment to regulate its temperature, said air conditioner having an air passage terminating in a plurality of outlets opening into said compartment, comprising:

outlet control means for closing each of said outlets to block air flow therethrough, said outlet control means being operable to open a selected number of outlets to permit air flow therethrough;

air-flow control means for controlling the rate of air flow through said air passage toward said compartment;

means for setting a desired value for compartment temperature and generating an electrical signal indicative of said desired compartment temperature value;

a source for generating an electrical signal indicative of an actual value for compartment temperature;

a control circuit for determining a value corresponding to a setting of said air-flow control means, said control circuit including means for selecting one of said outlets to open the same in response to a single-flow mode requirement and for selecting two of said outlets to open the same in response to a dual-flow mode requirement, said control circuit further including means for subtracting said desired value from said actual value to obtain a difference between said actual and desired compartment temperature values, said control circuit including means for comparing said difference with a first, second, third and fourth predetermined value, said second predetermined value being a negative value greater than said first predetermined value, said third predetermined value being a positive value less than said fourth predetermined value, and said control circuit further including means responsive to a dual-flow mode requirement for determining said value for a setting of said air-flow control means as:

a first preset value when said difference is less than said first predetermined value;

a first variable value less than said first preset value when said difference is between said first and second predetermined values, said first variable value decreasing with said difference increasing;

a second preset value less than said first variable value when said difference is between said second and third predetermined values;

a second variable value greater than said second preset value when said difference is between said third and fourth predetermined values, said second variable value increasing with said difference increasing;

a third preset value greater than said second variable value when said difference is greater than said fourth predetermined value; and a circuit coupled between said control circuit and said air-flow control means for converting said determined value into a setting of said air-flow control means for controlling the rate of air flow through said air passage.

2. An apparatus for controlling an air conditioner as set forth in claim 1, wherein said control circuit includes means responsive to a single-flow mode requirement for determining said value for a setting of said air-flow control means as:

said first preset value when said difference is less than said first predetermined value;

a third variable value less than said first preset value and less than said first variable value when said difference is between said first and second predetermined values, said third variable value decreasing with said difference increasing;

a fourth preset value less than said third variable value and less than said second preset value when said difference is between said second and third predetermined values;

a fourth variable value greater than said fourth preset value but less than said second variable value when said difference is between said third and fourth predetermined values, said fourth variable value increasing with said difference increasing; and said third preset value greater than said fourth variable value when said difference is greater than said fourth predetermined value.

3. An apparatus for controlling an air conditioner used in a process of treating air in a compartment to regulate its temperature, said air conditioner having an air passage terminating in a plurality of outlets opening into said compartment, comprising:

outlet control means for closing each of said outlets to block air flow therethrough, said outlet control means being operable to open a selected number of outlets to permit air flow therethrough;

air-flow control means for controlling the rate of air flow through said air passage toward said compartment;

means for setting a desired value for compartment temperature and generating an electrical signal indicative of said desired compartment temperature value;

a source for generating electrical signals indicative of an actual value for compartment temperature, a value for ambient temperature, and a value for insolation quantity, respectively;

a control circuit for determining a value corresponding to a setting of said air-flow control means, said control circuit including means for selecting one of said outlets to open the same in response to a single-flow mode requirement and for selecting two of said outlets to open the same in response to a dual-flow mode requirement, said control means including means for modifying said desired compartment temperature value in accordance with ambient temperature and insolation quantity to obtain a target value for compartment temperature, said control circuit also including means for subtracting said target value from said actual value to obtain a difference between said actual and target compartment temperature values, and said control circuit further including means for comparing said difference with first, second, third and fourth predetermined values, said second predetermined value being a negative value greater than said first predetermined value, said third predetermined value being a positive value less than said fourth predetermined value, said control circuit including means responsive to a dual-flow mode requirement for determining said value for a setting of said air-flow control means as:

a first preset value when said difference is less than said first predetermined value;

a first variable value less than said first preset value when said difference is between said first and second predetermined values, said first variable value decreasing with said difference increasing;

a second preset value less than said first variable value when said difference is between said second and third predetermined values;

a second variable value greater than said second preset value when said difference is between said third and fourth predetermined values, said second variable value increasing with said difference increasing;

a third preset value greater than said second variable value when said difference is greater than said fourth predetermined value; and a circuit coupled between said control circuit and said air-flow control means for converting said determined value into a setting of said air-flow control means for controlling the rate of air flow through said air passage.

4. An apparatus for controlling an air conditioner as set forth in claim 3, wherein said control circuit includes means responsive to a single-flow mode requirement for determining said value for a setting of said air-flow control means as:

said first preset value when said difference is less than said first predetermined value;

a third variable value less than said first preset value and less than said first variable value when said difference is between said first and second predetermined values, said third variable value decreasing with said difference increasing;

a fourth preset value less than said third variable value and less than said second preset value when said difference is between said second and third predetermined values;

a fourth variable value greater than said fourth preset value but less than said second variable value when said difference is between said third and fourth predetermined values, said fourth variable value increasing with said difference increasing; and said third preset value greater than said fourth variable value when said difference is greater than said fourth predetermined value.

5. An apparatus for controlling an air conditioner used in a process of treating air in a compartment to regulate its temperature, said air conditioner having an air passage opening into said compartment through a plurality of outlets, a blower disposed in said air passage, and a blower-motor for driving said blower to create air flow through said air passage toward said compartment, comprising:

outlet control means for closing each of said outlets to block air flow therethrough, said outlet control means being operable to open a selected number of outlets to permit air flow therethrough;

an adjustable means for controlling the voltage applied to said blower-motor to control the rate of air flow through said air passages;

means for setting a desired value for compartment temperature and generating an electrical signal indicative of said desired compartment temperature value;

sources for generating electrical signals indicative of an actual value for compartment temperature, and a value for insolation quantity, respectively;

a control circuit for determining a value corresponding to a setting of said adjustable means, said control circuit including means for selecting one of said outlets in response to a single-flow mode requirement and for selecting two of said outlets in response to a dual-flow mode requirement, said control circuit further including means for modifying said desired compartment temperature value in accordance with ambient temperature and insolation quantity to obtain a target value for compartment temperature, said control circuit further including means for subtracting said target value from said actual value to obtain a difference between said actual and target compartment temperature values, said control circuit further including means for comparing said difference with first, second, third and fourth predetermined values, said second predetermined value being a negative value greater than said first predetermined value, said third predetermined value being a positive value less than said fourth predetermined value, said control circuit including means responsive to a dual-flow mode requirement for determining said value for a setting of said air-flow control means as:
a first preset value when said difference is less than said first predetermined value;
a first variable value less than said first preset value when said difference is between said first and second predetermined values, said first variable value decreasing with said difference increasing;
a second preset value less than said first variable value when said difference is between said second and third predetermined values;
a second variable value greater than said second preset value when said difference is between said third and fourth predetermined values, said second variable value increasing with said difference increasing;
a third preset value greater than said second variable value when said difference is greater than said fourth predetermined value; and
a circuit coupled between said control circuit and said adjustable means for converting said determined value into a setting of said adjustable means.

6. An apparatus for controlling an air conditioner as set forth in claim 5, wherein said control circuit includes means responsive to a single-flow mode requirement for determining said value for a setting of said air-flow control means as:
said first preset value when said difference is less than said first predetermined value;
a third variable value less than said first preset value and less than said first variable value when said difference is between said first and second predetermined values, said third variable value decreasing with said difference increasing;
a fourth preset value less than said third variable value and less than said second preset value when said difference is between said second and third predetermined values;
a fourth variable value greater than said fourth preset value but less than said second variable value when said difference is between said third and fourth predetermined values, said fourth variable value increasing with said difference increasing; and
said third preset value greater than said fourth variable value when said difference is greater than said fourth predetermined value.

7. An apparatus for controlling an air conditioner used in a process of treating air in a compartment to regulate its temperature, said air conditioner having an air passage opening into said compartment through a plurality of outlets, outlet control means for closing each of said outlets to block air flow therethrough, said outlet control means being operable to open a selected number of outlets to permit air flow therethrough, and air-flow control means for controlling the rate of air flow through said air passage toward said compartment, comprising the steps of:
selecting one of said outlets in response to a single-flow mode requirement or two of said outlets in response to a dual-flow mode requirement;
generating an electrical signal indicative of a desired value for compartment temperature;
generating electrical signals indicative of an actual value for compartment temperature, a value for ambient temperature, and a value for insolation quantity, respectively;
modifying said desired compartment temperature value for ambient temperature and insolation quantity to obtain a target value for compartment temperature;
subtracting said target value from said actual value to obtain a difference between said actual and target compartment temperature values;
comparing said difference with first, second, third and fourth predetermined values, said second predetermined value being a negative value greater than said first predetermined value, said third predetermined value being a positive value less than said fourth predetermined value;
determining said value for a setting of said air-flow control means when a dual-flow mode requirement occurs as:
a first preset value when said difference is less than said first predetermined value;
a first variable value less than said first preset value when said difference is between said first and second predetermined values, said first variable value decreasing with said difference increasing;
a second preset value less than said first variable value when said difference is between said second and third predetermined values;
a second variable value greater than said second preset value when said difference is between said third and fourth predetermined values, said second variable value increasing with said difference increasing;
a third preset value greater than said second variable value when said difference is greater than said fourth predetermined value; and
converting said determined value into a setting of said air-flow control means.

8. An apparatus for controlling an air conditioner as set forth in clam 7, wherein the step of calculating a value corresponding to a setting of said air-flow control means includes the step of determining said value for a setting of said air-flow control means when a single-flow mode requirement occurs as:
said first preset value when said difference is less than said first predetermined value;
a third variable value less than said first preset value and less than said first variable value when said difference is between said first and second predetermined values, said third variable value decreasing with said difference increasing;
a fourth preset value less than said third variable value and less than said second preset value when said difference is between said second and third predetermined values;
a fourth variable value greater than said fourth preset value but less than said second variable value when said difference is between said third and fourth predetermined values, said fourth variable value increasing with said difference increasing; and
said third preset value greater than said fourth variable value when said difference is greater than said fourth predetermined value.

* * * * *

UNITED STATES PATENT AND TRADEMARK OFFICE
CERTIFICATE OF CORRECTION

PATENT NO.   :   4,523,715
DATED        :   Jun. 18, 1985
INVENTOR(S)  :   OHSAWA et al.

It is certified that error appears in the above-identified patent and that said Letters Patent is hereby corrected as shown below:

IN THE BIBLIOGRAPHICAL DATA:

At item [73] ASSIGNEE: Please change the ASSIGNEE to read:
-- NISSAN SHATAI COMPANY, LIMITED --
         Kanagawa-ken, JAPAN --

Signed and Sealed this

Fifteenth Day of July 1986

[SEAL]

Attest:

DONALD J. QUIGG

Attesting Officer

Commissioner of Patents and Trademarks